United States Patent
Holz

(10) Patent No.: US 7,097,333 B2
(45) Date of Patent: Aug. 29, 2006

(54) HEADLIGHT FOR A MOTOR VEHICLE

(75) Inventor: Michael Holz, Senden (DE)

(73) Assignee: DaimlerChrysler AG, Stuttgart (DE)

( * ) Notice: Subject to any disclaimer, the term of this patent is extended or adjusted under 35 U.S.C. 154(b) by 183 days.

(21) Appl. No.: 10/862,850

(22) Filed: Jun. 7, 2004

(65) Prior Publication Data

US 2005/0002202 A1    Jan. 6, 2005

(30) Foreign Application Priority Data

Jun. 6, 2003 (DE) ................... 103 26 148

(51) Int. Cl.
*F21V 9/00* (2006.01)
(52) U.S. Cl. .................. 362/511; 362/539; 362/512
(58) Field of Classification Search ............. 363/539, 363/511, 512, 475, 507, 543, 544, 545, 231; 362/539, 511, 512, 475, 507, 543, 544, 545, 362/231

See application file for complete search history.

(56) References Cited

U.S. PATENT DOCUMENTS 2,945,985 A    7/1960   Madsen 6,709,135 B1 *   3/2004   Couillaud et al. .......... 362/465
6,776,513 B1 *   8/2004   Albou .......................... 362/507
2001/0019482 A1 *   9/2001   Kobayashi et al. ......... 362/510

FOREIGN PATENT DOCUMENTS

DE     195 48 187 A1     1/1997
DE     196 32 252 A1     1/1998
DE     197 31 754 A1     2/1999
EP     0 479 634 A1 *    4/1992

* cited by examiner

*Primary Examiner*—Ali Alavi
*Assistant Examiner*—Bao Q. Truong
(74) *Attorney, Agent, or Firm*—Akerman Senterfitt; Stephan A. Pendorf

(57) ABSTRACT

The invention concerns a headlight (1) for a motor vehicle. This includes a light source (2) for visible light and a source (3) for infrared radiation and a lens (6) through which the visible light and the infrared radiation can be emitted out of the headlight (1). In accordance with the invention there is additionally provided a bi-metallic element (4) in the area between the source (3) for the infrared radiation and the lens (6) in such a manner that during operation of the light source (2) the path of the infrared radiation from the source (3) to the lens (6) is open, and in the non-operating condition of the light source (2) the path is interrupted.

The invention provides a headlight (1) for motor vehicles which is very safe for eyes.

12 Claims, 4 Drawing Sheets

HEADLIGHT FOR A MOTOR VEHICLE

BACKGROUND OF THE INVENTION

1. Field of Invention

The invention concerns a headlight for a motor vehicle according to the precharacterizing portion of patent claim 1. A headlight of this general type is known from German Published Application DE 197 31 754 A1.

2. Related Art of the Invention

For ensuring that the described headlight is safe for the eyes, a photodiode and an associated amplifier as well as a controller are provided, by means of which it is detected whether or not the light source is emitting visible light. If it emits visible light, then the controller for the infrared light source, which is a component of an IR range sensor, does not cause any reduction in the output power of the infrared light source, in comparison to which, in the case that visible light is not detected, it causes a reduction in the output power of the infrared light source. By reducing the output power, the danger of damaging the eyes with the infrared radiation is prevented. If the visible light source is in operation, then simultaneously visible light and infrared radiation are emitted, whereby a sufficient safety for the eyes is achieved on the basis of the eyelid closing reflex of illuminated traffic participants.

SUMMARY OF THE INVENTION

The invention is based on the object of providing a headlight for motor vehicles, which ensures in a simple and robust manner a sufficient safety for the eyes.

This object is accomplished by a headlight having the characterizing features of claim 1.

Advantageous embodiments are set forth in the dependent claims.

The inventive headlight includes a headlight for visible light, a source for infrared radiation, which has a longer wavelength than the visible light, as well as a lens, which may be a simple disc, through which the visible light and the infrared radiation are emitted from the headlight, as well as bi-metallic element, which is constructed and located in such a manner on the headlight, that during operation of the light source it does not interrupt the radiation path of the infrared radiation from the source for the infrared radiation to the lens, and therewith keeps it open, in comparison to which during non-operation of the light source the radiation path of the infrared radiation from the source to the lens is interrupted. This is achieved in that the light source for visible light during operation warms its environment, so that the bi-metallic element assumes, due temperature, a different shape than during non-operation of the light source which is associated with a significantly lower temperature in the environment of the light source and therewith of the bi-metallic element. These differing external shapes of the bi-metallic element, depending upon the temperature, make it possible to reliably distinguish between operation and non-operation of the light source, and accordingly to either interrupt or open the radiation path between the source for infrared radiation and the disk. By the placement and use of a bi-metallic element in the vicinity of the light source a very robust and economical precautionary means is provided, which prevents the headlight from emitting exclusively infrared radiation of significant power which could endanger the eyes of other traffic participants. By this design of a motor vehicle headlight with a bi-metallic element it is accomplished that a sufficient eye safety is provided. This succeeds even under very difficult general conditions, which routinely occur in a vehicle. For example, this headlight is reliably functional even under substantial vibrations, which is not always the case with the state of the art known headlights with extensive electronic and associated circuitry.

In the inventive headlight the bi-metallic element is used either to completely or substantially interrupt the radiation path, leading to a sufficient eye safety, in that the emitted power is substantially lowered or completely reduced to zero. In appropriate manner, during operation of the light source the radiation path is kept free, at least to the extent that the desired IR-radiation output from the headlight is emitted. Therein the radiation path of the infrared radiation can be completely opened, only substantially opened, or predominantly opened.

Therein the bi-metallic element is so constructed that the employed materials and the thermal expansion of the bi-metallic element insure that the desired deformation is achieved with the expected temperature differential at the location of the bi-metallic element, which makes possible the interruption or, as the case may be, the opening of the radiation path.

It has been found to be very advantageous to design the bi-metallic element in the shape of a strip or in the shape of a spiral or a coil. By these selected shapes of bi-metallic element it is accomplished in preferred manner to open or to interrupt the radiation path of the infrared radiation in reliable manner. Therein the spiral shaped or coil shaped designs of the bi-metallic element have proven themselves particularly useful, since these, due to their length, produce a pronounced deflection or, as the case may be, shape change of the bi-metallic element during temperature changes and thereby, even with relatively small temperature changes, exhibit a reliable opening or interruption of the light path. This leads, in the case of the typical significant temperature differentials, to a very rapid and reliable interruption or opening of the radiation path, which with regard to eye safety is of particular interest.

Beyond this, it has been found very beneficial to locate the bi-metallic element in the immediate vicinity of the light source of for visible light, which may in particular be a halogen lamp or a gas discharge lamp. Thereby it is ensured in particularly advantageous manner that the bi-metallic element is matched in its temperature response very clearly to the temperature of the light source and therewith provides a pronounced and reliable indication regarding the operating condition of the light source on the basis of the temperature of the light source, and therewith on the basis of the temperature of the bi-metallic element. Particularly in the case of halogen lights or, as the case may be, gas discharge lights the temperature of the light source during operation is very high and in non-operation is minimal, so that the bi-metallic element located in the immediate vicinity of the light source is subjected to very strong temperate oscillations directly indicative of the operating condition, and thereby is subjected to very pronounced deflections or other changes of shape. These changes lead to a very rapid and reliable opening or interruption of the beam path and therewith to a headlight that is very safe for the eyes.

It has been found particularly advantageous to locate the bi-metallic element along the light source, particularly in the immediate vicinity thereof, so that the temperature of the bi-metallic element along its length or along a substantial part of its length is in effective contact with the light source, so that the thermal influence of the light source has a very pronounced effect on the bi-metallic element. This leads to an improved location of the bi-metallic element and therewith to an improved functionality of the inventive headlight.

A particularly preferred embodiment of the inventive headlight for a motor vehicle includes one source for the infrared light radiation with a pronounced, directional emission characteristic for the infrared radiation, as a result of which it becomes possible to very efficiently interrupt the radiation path between the source and lens. The use of infrared light sources, in particular IR-VCSL-diodes or, as the case may be, infrared LEDs or optical fiber light guides or, respectively, their ends or outputs, have been found useful. In particular, the employment of an optical fiber as source for the infrared radiation makes it possible to guide the optical fiber or, as the case may be, the end of the optical fiber, very close to the light source, which results in a very compact and simple manner of construction of the headlight, since by this design it becomes possible in particular to employ for the beam path of the infrared radiation the same optical elements—such as for example reflectors, lenses, shutters or filters—as employed for the visible light emitted by the light source. A complex duplicative design of various optical elements for the infrared radiation on the one hand and for the visible light on the other hand is not necessary, particularly in the case of the use of a light source in the form of a optical fiber, and results therewith in a very simple, compact and therewith also robust headlight. By the pronounced, directional emission characteristic of the infrared emission out of the source it becomes possible to reliably open or as the case may be interrupt the radiation path in particular when the bi-metallic element is located in the immediate vicinity of the source. Therein, due to the pronounced emission characteristic, the bi-metallic element or as the case may be the area of the bi-metallic element which interrupts or opens the radiation path can be very compact, which again leads to a compact and robust as well as simple design of headlight for infrared radiation and visible light.

The use of infrared laser sources, IR-VCSELs or, as the case may be, infrared LEDs, has been found particularly advantageous, since these are very light-intense and, in relationship to their light power or as the case may be light output, have very small surface area sources for infrared radiation with appropriately small emission cross-section, and therewith can be reliably interrupted or opened by a bi-metallic element which changes its shape on the basis of changed temperature. It is precisely such a small surface area source for infrared emission, in combination with a bi-metallic element which is in the immediate vicinity of or in direct contact with the light source, that has been found to be very advantageous, since here the advantages with regard to compact, robust and economic realization of a motor vehicle headlight safe for the eyes are accomplished and embodied in particular measure.

It has been found particularly advantageous that the bi-metallic element is so constructed or, as the case may be, located, that the bi-metallic element includes a recess, through which the infrared radiation can pass to the lens during operation of the light source, while during non-operation of the light source the radiation is interrupted by the bi-metallic element. Therein it has been found particularly advantageous to so design the recess and to so locate the bi-metallic element that a shaping of. the emission of the infrared radiation occurs by the recess in the operating condition of the light source. This leads thereto, that a purposeful radiation of the environment with infrared radiation can be achieved by the headlight for the motor vehicle, without requiring a number of additional complex supplement elements, for example, shutters or other optical frequency selective elements. Therewith it becomes possible to accomplish a very reliable realization of the headlight and therein, due to the relatively small design of the recess, it becomes possible to provide very rapid reliable interruption of the radiation path.

Alternatively thereto, it has been found particularly advantageous to design the bi-metallic element with a surface or two-dimensional widening in the area of the source for infrared radiation, whereby it is accomplished that the beam path of the infrared emission is safety and efficiently and reliably interrupted by the widening as compared to a non-widened embedment of the bi-metallic element. If the two-dimensional widening is located at the end area of the bi-metallic element, and thus in the radiation path of the infrared radiation, then it is accomplished beyond this on the basis of the pronounced change in the shape of the bi-metallic element during temperature changes over the entire length of the bi-metallic element to unblock or, as the case may be, interrupt the entire or substantially the entire cross-section of the radiation path of the infrared radiation. This design has proven itself particularly effective when the entire or a substantial part of the length of the bi-metallic element is provided over or in the immediate vicinity of the light source, such that a pronounced change in the shape and therewith the position of the two dimensional widening of the bi-metallic element can be achieved. This leads to a very advantageous further development of the invention.

Beyond this, it has been found particularly advantageous to construct the headlight with a housing, which together with the lens produces a substantially closed or completely enclosed unit. Therein there is secured the light source for visible light and the source for infrared emission in the form of an optical fiber, which is located near to the light source. The optical fiber ends in the area of the light source for visible light and passes through an opening in the housing to the outside of the housing. The infrared radiation is coupled into the optical fiber from outside and channeled via the optical fiber into the inside of the housing of the headlight and is emitted out of the optical fiber near the light source for visible light. The bi-metallic element is so located in the area of the light source that it is adapted at one end area to lie in front of the end of the optical fiber. Therein it is so designed, that for example during operation of the light source it comes into a second position set-off from the end of the optical fiber and therewith frees or unblocks the radiation path of the infrared radiation, while in the other operating condition of the light source its end area comes into a position at the end of the source, therewith interrupting or blocking the IR-radiation path. Alternatively there is the possibility, by means of a recess or opening, during operation to free the radiation path and during a non-operation to so change the bi-metallic element in its shape that it blocks or interrupts the radiation path.

The source for infrared radiation and the light source emit the infrared radiation or as the case may be the visible light and direct it over substantially common optical components, for example over reflectors, shutters, optical collectors or diffusers or filter, in the direction of the lens and through this in order to illuminate the environment of the vehicle in which the inventive headlight is integrated. By this inventive design of the headlight a compact, reliably operating and robust headlight is provided, which protects the eyes from infrared radiation even under extreme conditions, for example extreme external temperature conditions, vibrations and the like, operates reliably and protects other traffic participants from damage to the eyes due to infrared radiation substantially.

BRIEF DESCRIPTION OF THE DRAWING

In the following the invention will be described in greater detail on the basis of an illustrative embodiment.

DETAILED DESCRIPTION OF THE INVENTION

Figure 1:
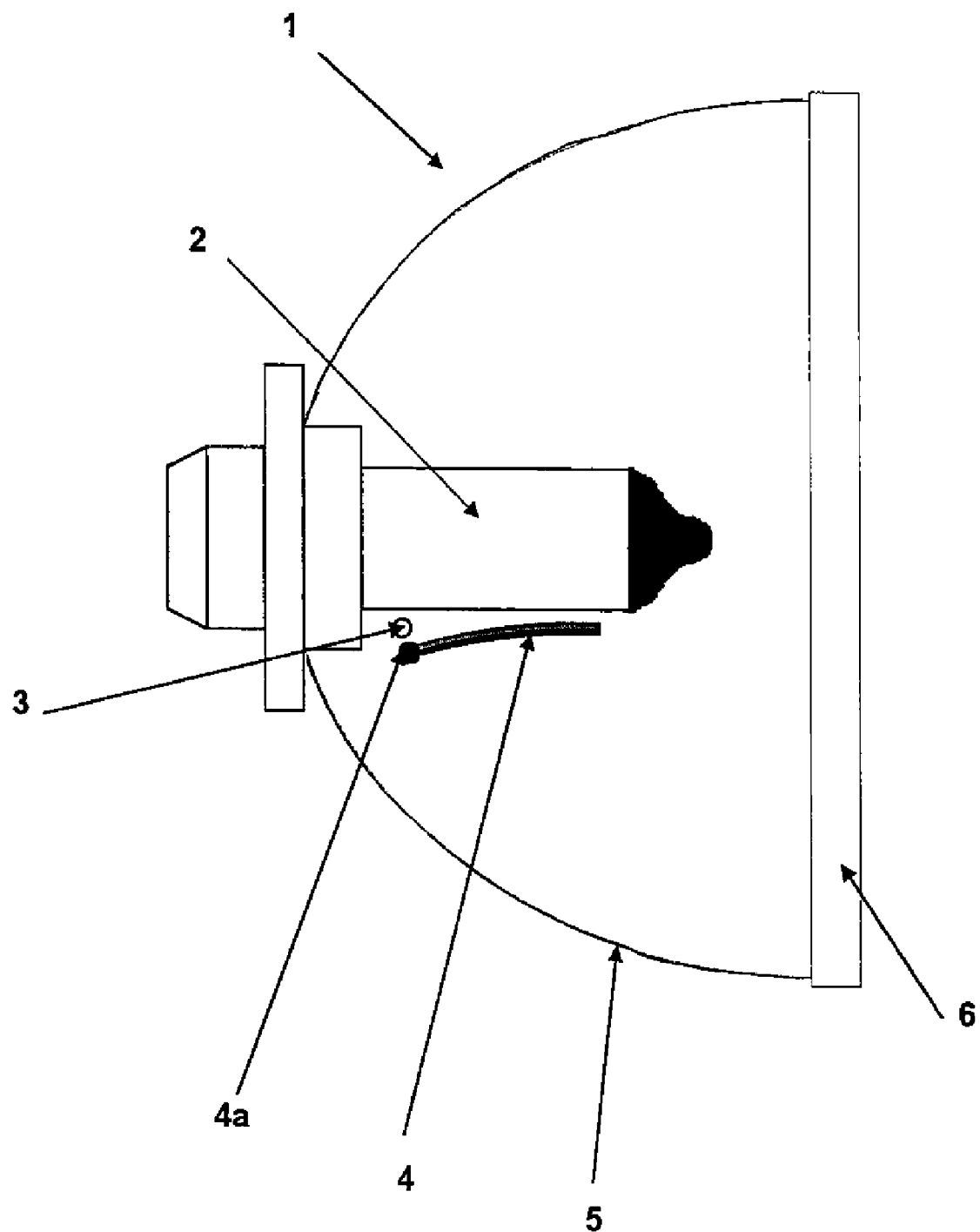
FIG. 1 shows an exemplary inventive headlight during operation of the light source for visible light.

In FIG. 1 a schematic configuration or layout of an inventive headlight 1 is shown. The headlight 1 for a motor vehicle includes a light source 2 for visible light and a source 3 for infrared radiation. These are provided in a housing 5, which includes a disk or lens 6, through which the visible light of the light source 2 and the infrared radiation of source 3 are emitted out of the headlight 1. The inside of the housing 5 is partially mirrored, so that it performs the function of a reflector, which guides the visible or, as the case may be, emitted infrared radiation emitted from the light source 2 and the source 3, so that these pass through the lens and out of the headlight.

The source 3 for infrared radiation is part of an optical fiber, out of the end of which the infrared radiation is emitted into the headlight 1. The end 3 of the optical fiber forms the source 3. The optical fiber passes through the housing 5 and ends outside of the headlight 1, where a strong infrared radiation source is provided, which is for example an infrared laser and which couples the infrared radiation into the optical fiber. The end 3 of the optical fiber is located in the immediate vicinity of the light source 2, which here is a halogen light 2. It is in the immediate sphere of influence of the halogen light 2 which operates at a high operating temperature. By being an optical fiber it is suited to withstanding these high temperatures without problem.

By the selection of the source 3 as an end of an optical fiber it is ensured that the source 3 exhibits a pronounced oriented emission characteristic. The emitted infrared radiation is emitted in the headlight 1 perpendicular to the main emission direction of the halogen light 2 and is reflected via the reflector of the housing 3 together with the visible light of the halogen lamp 2 in the direction of the lens 6 and is emitted there from together therewith out of the headlight 1.

In addition, in the headlight 1 or, as the case may be, in the housing 5, there is a bi-metallic element 4, which is shown as a two dimensional element and extends along the halogen light 2 in the immediate vicinity thereof. By this strip-shaped embodiment of the bi-metallic element 4 and its location along the halogen light 2 it is accomplished that a temperature effect caused by the halogen light 2 acts upon the bi-metallic element 4 causing a strong change in the shape of the bi-metallic element 4.

In FIG. 1 the condition is shown in which the halogen 2 is in operation and, on the basis of its operation, is strongly heated and thereby significantly heats the bi-metallic element 4, so that it undergoes a bending. as shown in FIG. 1, which frees or unblocks the end 3 of the optical fiber and makes it possible that the emitted infrared radiation can pass unimpeded along the radiation path over the reflector of the housing 5 through the lens 6. The condition shown in FIG. 1 shows the operation condition of the headlight 1, in which the radiation path of the infrared radiation from the source 3 is not interrupted by the bi-metallic element 4 and therewith is open. By the design of the bi-metallic element 4 shown in FIG. 1 it is possible to completely free up the radiation path of the infrared radiation out of the end 3 of the optical fiber, so that a prevention of the spreading out of the infrared radiation onto the radiation path is substantially prevented by the bi-metallic element 4.

Figure 2:
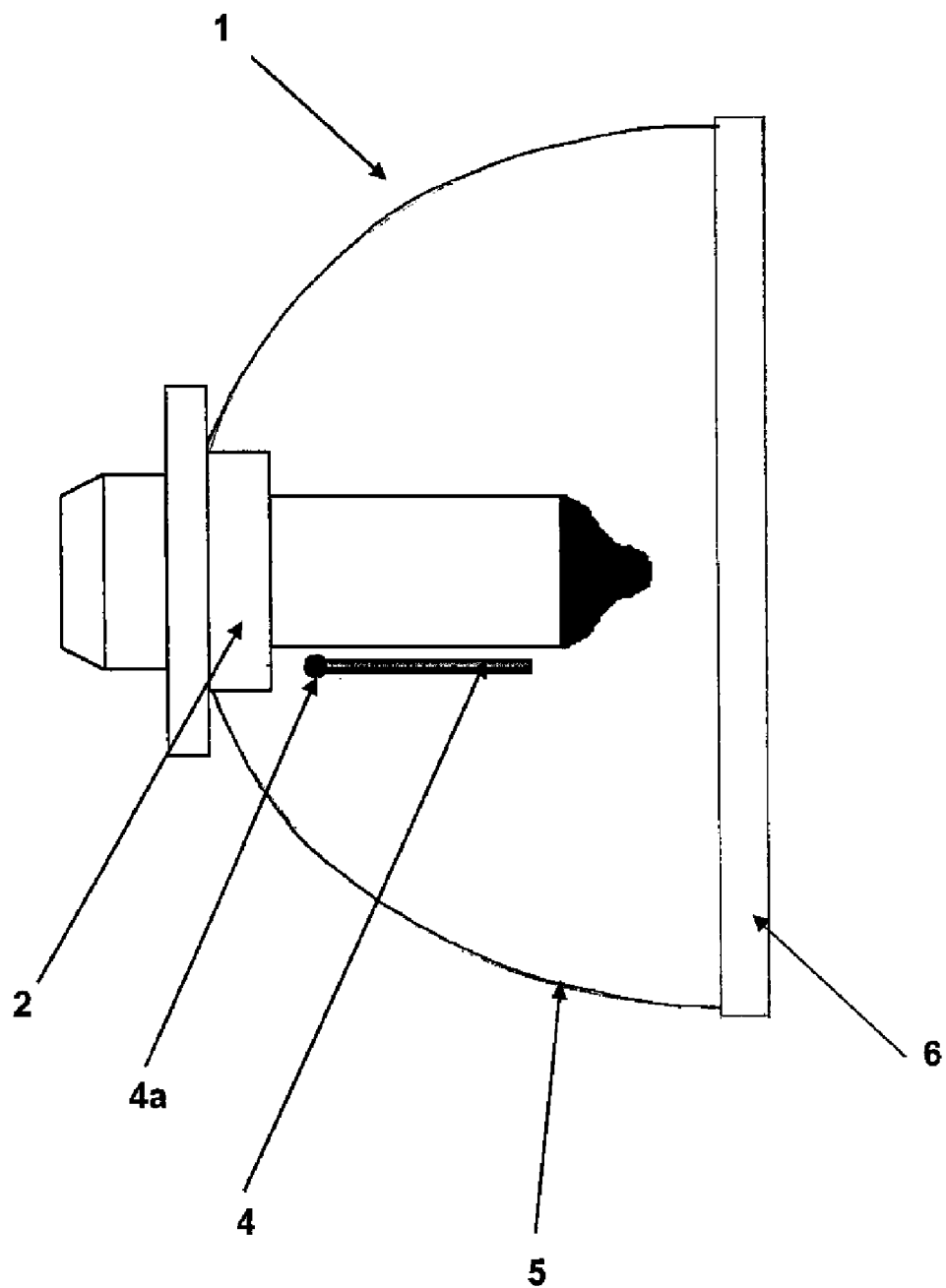
FIG. 2 shows an exemplary headlight according to FIG. 1 with inactive light source.
Figure 3:
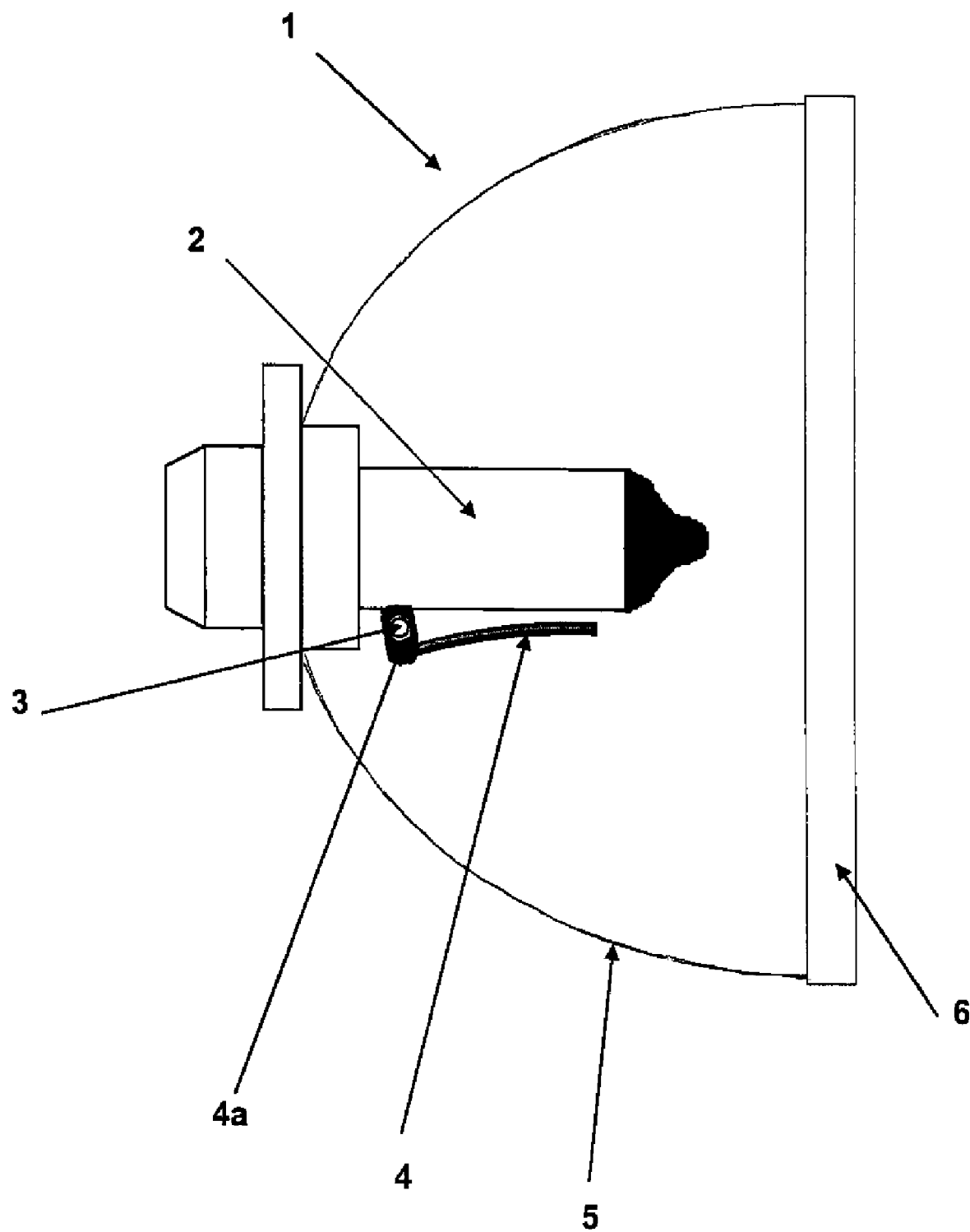
FIG. 3 shows an alternative exemplary inventive headlight with an opening in the bimetallic element which shapes the radiation pattern of the infrared radiation during operation of the light source for visible light.
Figure 4:
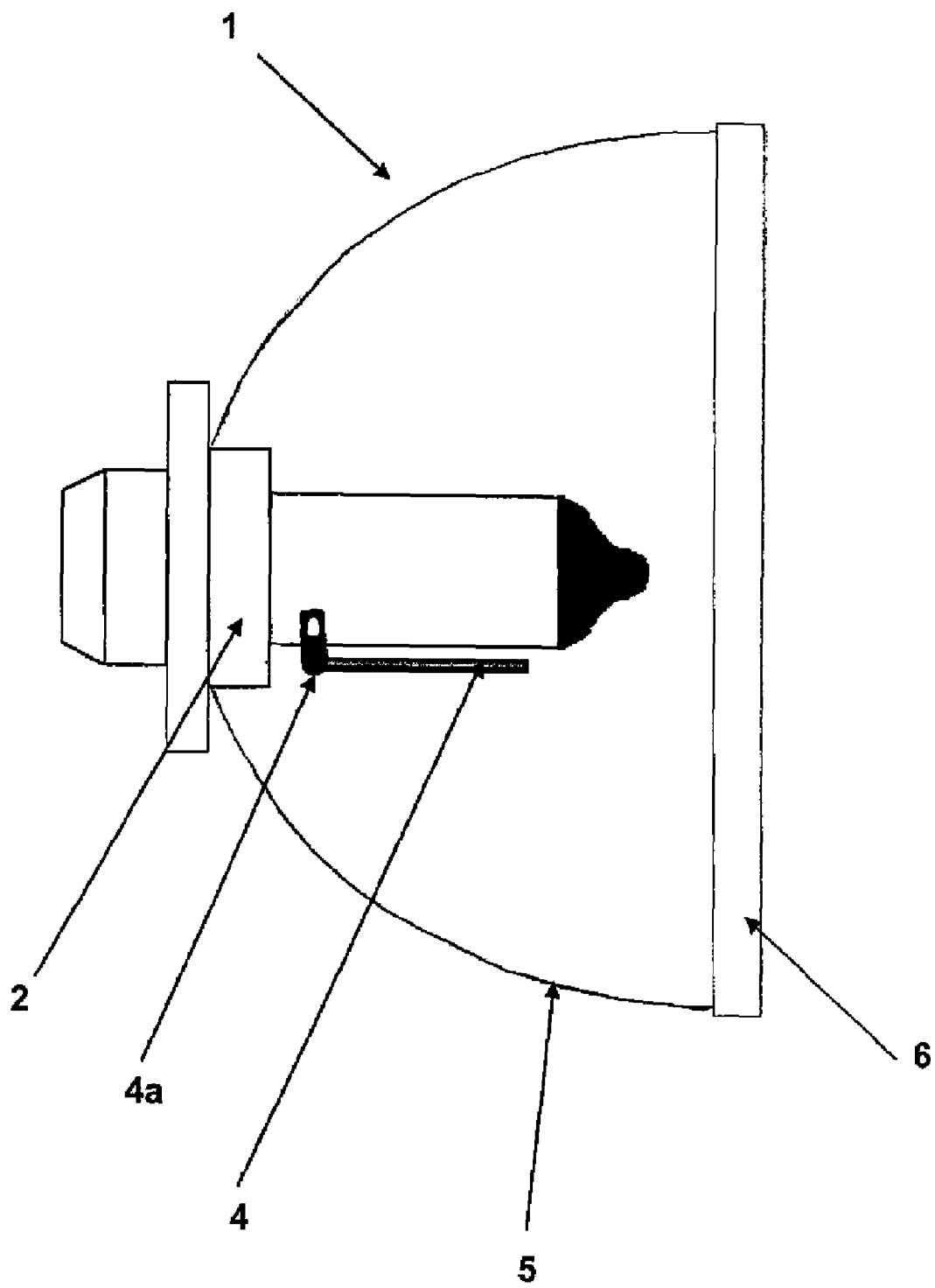
FIG 4. shows the exemplary headlight according to FIG. 3 with inactive light source.

The end of the bi-metallic element 4 away from the end 3 of the optical fiber is fixed in its position, and is moveable on the other end, which is closest to the end 3 of the optical fiber. On this end a circular two-dimensional widening 4a is provided, which provides the possibility to reliably and completely or, as the case may be, substantially completely cover the end 3 of the optical fiber. This condition is shown in FIG. 2. Here the circular shaped two dimensional widening 4a of the bi-metallic element 4 covers the end 3 of the optical fiber. Thereby it is achieved that out of the end 3 of the optical fiber, which is the source 3 of the infrared radiation, no or only a small amount can find its way along the path, thorough the lens 6, and out of the headlight 1, since the radiation path is interrupted by the bi-metallic element 4, in particular by the circular two dimensional widening 4a. In the arrangement or device shown in FIG. 2 the bi-metallic element 4 with the circular shaped two dimensional widening 4a is so located relative to the end 3 of the optical fiber that in the illustrated condition it lies immediately adjacent and thereby achieves a maximal and very reliable interruption of the radiation path.

The condition shown in FIG. 2 of the interruption of the radiation path of the infrared radiation occurs when the halogen light 2 is not in operation and thereby the halogen light 2 does not cause a high temperature in its environment, in particular on the bi-metallic element 4, as was the case in operation, and thereby the bi-metallic element 4 assumes a straight shape and, with the aid of the circular shaped two-dimensional widening 4, covers the end 3 of the optical fiber as well as the source of the infrared radiation and thereby interrupts the radiation path of the infrared radiation.

Thereby it is ensured, that in the case that the halogen light 2 is in operation and emits visible, blinding light, infrared radiation can be emitted parallel thereto, so that it is ensured that another traffic participant who looks into the headlights is blinded by the visible light and by the eyelid closing reflex is protected from damage by the visible light and, to a greater extent, by the infrared radiation. This protection also exists when, due to a defect or breakage of the halogen light 2 or some other failure in control of the halogen light 2, this is not in operation, and thus the positive effect of the eyelid reflex cannot be counted upon for protection of the eyes of the traffic participants. This is however accomplished in accordance with the invention, in that the bi-metallic element 4 very reliably and efficiently interrupts or, as the case may be, opens the IR-radiation path.

This headlight for provision of a purposeful interruption or reduction of the emitted infrared radiation power is proving itself not only to be safe for the eyes, but rather is also very simple, economical and robust, since it exhibits on the one hand a very simple construction and on the other hand dispenses with the employment of complex electronic components, which are liable to failure.

The invention claimed is:

1. A headlight for a motor vehicle comprising:
   a light source for visible light,
   a source for infrared radiation, a lens through which the visible light and the infrared radiation pass along a radiation path out of the headlight, and a bi-metallic element (4) provided in the vicinity of the radiation path between the source (3) for the infrared radiation and the lens (6) in such a manner, that during operation of the light source (2) the radiation path of the infrared radiation between the source (3) and the lens (6) is open and during non-operation condition of the light source the radiation path is interrupted.

2. The headlight for a motor vehicle according to claim 1, wherein the bi-metallic element (4) is in the shape of a strip or a spiral.

3. The headlight for a motor vehicle according to claim 1, wherein the bi-metallic element (4) is provided in the immediate vicinity of the light source (2).

4. The headlight for a motor vehicle according to claim 1, wherein the bi-metallic element (4) extends along the light source (2).

5. The headlight for a motor vehicle according to claim 1, wherein the source (3) for the infrared radiation has a pronounced directional radiation characteristic.

6. The headlight for a motor vehicle according to claim 5, wherein the source (3) is an end of an optical fiber, a IR-laser source or an IR-LED.

7. The headlight for a motor vehicle according to claim 5, wherein the bi-metallic element (4) during non-operation of the light source (2) is adjacent the source (3).

8. The headlight for a motor vehicle according to claim 7, wherein the bi-metallic element (4) is widened two dimensionally in the vicinity of the source (3).

9. The headlight for a motor vehicle according to claim 1, wherein the bi-metallic element (4) includes an opening or recess through which the infrared radiation passes on the way to the lens (6) during operation of the light source (2), while during non-operation of the light source (2) the radiation path is interrupted.

10. The headlight for a motor vehicle according to claim 9, wherein the opening or recess in the bi-metallic element (4) during operation of the light source (2) shapes the radiation pattern of the infrared radiation.

11. The headlight for a motor vehicle according to claim 1, wherein the bi-metallic element (4), the light source (2), as well as the source (3) are provided in a common housing (5) together with the lens (6), and that the bi-metallic element (4), as well as the source (3) which is an end of an optical fiber, are provided in the immediate vicinity of the light source (2).

12. The headlight for a motor vehicle according to claim 7, wherein during non-operation of the light source (2) the bi-metallic element (4) lies against the source (3).

* * * * *